(12) United States Patent
Emigh et al.

(10) Patent No.: US 8,909,622 B1
(45) Date of Patent: Dec. 9, 2014

(54) TIME-BASED LOG AND ALARM INTEGRATION SEARCH TOOL FOR TROUBLE-SHOOTING

(71) Applicant: Sprint Communications Company L.P., Overland Park, KS (US)

(72) Inventors: Michael A. Emigh, Tokyo (JP); Matthew D. Kurtz, Altamonte Springs, FL (US); Brian D. Lushear, Winter Springs, FL (US); Drew A. Shinholster, Jr., Maitland, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 162 days.

(21) Appl. No.: 13/723,189

(22) Filed: Dec. 20, 2012

(51) Int. Cl.
*G06F 17/30* (2006.01)
(52) U.S. Cl.
CPC ............................. *G06F 17/30554* (2013.01)

USPC .......................................................... 707/722
(58) Field of Classification Search
CPC ..................... G06F 17/30864; G06F 17/30867
See application file for complete search history.

(56) References Cited

U.S. PATENT DOCUMENTS

| | | | |
|---|---|---|---|
| 7,225,249 B1 * | 5/2007 | Barry et al. | 709/227 |
| 7,974,219 B2 * | 7/2011 | Strahan et al. | 370/254 |
| 8,738,760 B2 * | 5/2014 | Adams et al. | 709/224 |
| 2012/0290715 A1 * | 11/2012 | Dinger et al. | 709/224 |

\* cited by examiner

*Primary Examiner* — Rehana Perveen
*Assistant Examiner* — Loc Tran

(57) ABSTRACT

A packet network troubleshooting system. The system comprises a processor, a memory, and a search tool stored in the memory. When executed by the processor, the search tool searches system log, router command, maintenance, alarm, and trouble ticket data stores based on a search request and presents the results in chronological order. The search tool determines search keys for each of the data stores based on the search request.

20 Claims, 6 Drawing Sheets

TIME-BASED LOG AND ALARM INTEGRATION SEARCH TOOL FOR TROUBLE-SHOOTING

CROSS-REFERENCE TO RELATED APPLICATIONS

This application includes subject matter related to the following applications, which are hereby incorporated by reference: U.S. patent application Ser. No. 11/551,704, filed Oct. 21, 2006, entitled "Integrated Network and Customer Database," by Jose Gonzalez, et al.; U.S. patent application Ser. No. 11/620,140, filed Jan. 5, 2007, entitled "Customer Link Diversity Monitoring," by Jose Gonzalez, et al.; U.S. Pat. No. 7,830,816, issued Nov. 9, 2010, entitled "Network Access and Quality of Service Troubleshooting," by Jose Gonzalez, et al.; U.S. Pat. No. 7,831,709, issued Nov. 9, 2010, entitled "Flexible Grouping for Port Analysis," by David Ham, et al.; U.S. Pat. No. 7,904,553, issued Mar. 8, 2011, entitled "Translating Network Data into Customer Availability," by David Ham, et al.; U.S. patent application Ser. No. 12/639,906, filed Dec. 16, 2009, entitled "End-to-end Network Monitoring," by Brian D. Lushear, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communications between computers such as email, file transfer, and the like may be referred to as data communications and/or packet network communications. Some voice communications also comprises data communication, for example voice over internet protocol (VoIP) is a packet data communication protocol. Data communication may be propagated between routers. Routers are specialized computers that are configured to promote large throughput of data communication on many ports and/or interfaces. The data communication or network peripherals of a router may comprise a plurality of circuit cards. Each circuit card may itself support a plurality of separate data ports. Each data port or port may itself support a plurality of data communication circuits. Data communication may be interrupted when one or more of the circuits, ports, or circuit cards of one or more routers goes out of service for any of a variety of reasons. Such communication interruptions may result in reduced throughput or total communication blockage for some customers of the data communication service provider.

An enterprise or data communication subscriber may have a customer owned router that is linked to a router of the data communication service provider. In some data communication subscription contracts, the enterprise or data communication subscriber may be responsible for monitoring and managing their router. In other data communication subscription contracts, the data communication service provider may offer to manage the subscriber's router that connects to the data communication network, for example for an additional management fee.

SUMMARY

In an embodiment, a packet network troubleshooting system is disclosed. The system comprises a system logs data store comprising system logs, wherein the system logs comprise log messages generated by a plurality of network routers, a router command data store comprising router commands, wherein the router commands comprise commands executed on the plurality of network routers, a maintenance data store comprising entries describing maintenance items associated with one or more of the plurality of network routers, an alarms data store comprising alarms associated with one or more of the plurality of network routers, and a trouble ticket data store comprising trouble tickets opened against one or more of the network routers. The system further comprises a processor coupled to the system logs data store, the router command data store, the maintenance data store, the alarms data store, and the trouble ticket data store, a non-transitory memory coupled to the processor and a search tool stored in the non-transitory memory. When executed by the processor, the search tool receives a search request designating a trouble ticket stored in the trouble ticket data store and, in response to receiving the search request, identifies at least one of a router, a router interface, a router card, a router controller, a router port associated with the trouble ticket. The search tool further determines a first search key for the system logs data store based on the at least one of a router, a router interface, a router card, a router controller, a router port associated with the trouble ticket, determines a second search key for the router command data store based on the at least one of a router, a router interface, a router card, a router controller, a router port associated with the trouble ticket, determines a third search key for the maintenance data store based on the at least one of a router, a router interface, a router card, a router controller, a router port associated with the trouble ticket, and determines a fourth search key for the alarms data store based on the at least one of a router, a router interface, a router card, a router controller, a router port associated with the trouble ticket. The search tool further searches the system logs data store based on the first search key, searches the router command data store based on the second search key, searches the maintenance data store based on the third search key, searches the alarms data store based on the fourth search key, and presents results of the search in chronological order.

In an embodiment, a packet network troubleshooting system is disclosed. The system comprises a system logs data store comprising system logs, wherein the system logs comprise log messages generated by a plurality of network routers, a router command data store comprising router commands, wherein the router commands comprise commands executed on the plurality of network routers, a maintenance data store comprising entries describing maintenance items associated with one or more of the plurality of network routers, an alarms data store comprising alarms associated with one or more of the plurality of network routers, and a trouble ticket data store comprising trouble tickets opened against one or more of the network routers. The system further comprises a processor coupled to the system logs data store, the router command data store, the maintenance data store, the alarms data store, and the trouble ticket data store, a non-transitory memory coupled to the processor, and a search tool stored in the non-transitory memory. When executed by the processor, the search tool receives a search request designating a customer of a service provider, wherein the service provider that operates at least some of the plurality of network routers and provides network communication service to the customer and, in response to receiving the search request, identifies at least one of a router, a router interface, a router card, a router controller, a router port associated with the customer. The search tool further determines a first search key for the system logs data store based on the at least one of a router, a router interface, a router card, a router controller, a router port associated with the customer, determines a second search key for the router command data store based on the at least one of a router, a router interface, a router card, a router controller, a router port associated with the customer, determines a third search key for the maintenance data store based on the at least one of a router, a router interface, a router card, a router controller, a router port associated with the customer, determines a fourth search key for the alarms data store based on the at least one of a router, a router interface, a router card, a router controller, a router port associated with the customer, searches the system logs data store based on the first search key, searches the router command data store based on the second search key, searches the maintenance data store based on the third search key, searches the alarms data store based on the fourth search key, and presents results of the search in chronological order.

In an embodiment, a method of troubleshooting a packet network communication problem is disclosed. The method comprises receiving by a computer system a search request designating a trouble ticket, searching by the computer system a trouble ticket data store to find the designated trouble ticket, analyzing by the computer system the designated trouble ticket to determine at least one of a router identity, a router interface identity, a router card identity, or a router port identity associated with the designated trouble ticket, searching by the computer system for entries in a system logs data store, a router command data store, a maintenance data store, and an alarms data store based on at least one of the router identity, the router interface identity, the router card identity, or the router port identity, presenting by the computer system the results of searching in chronological order, and fixing a problem identified in the trouble ticket based on the presented results of searching.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
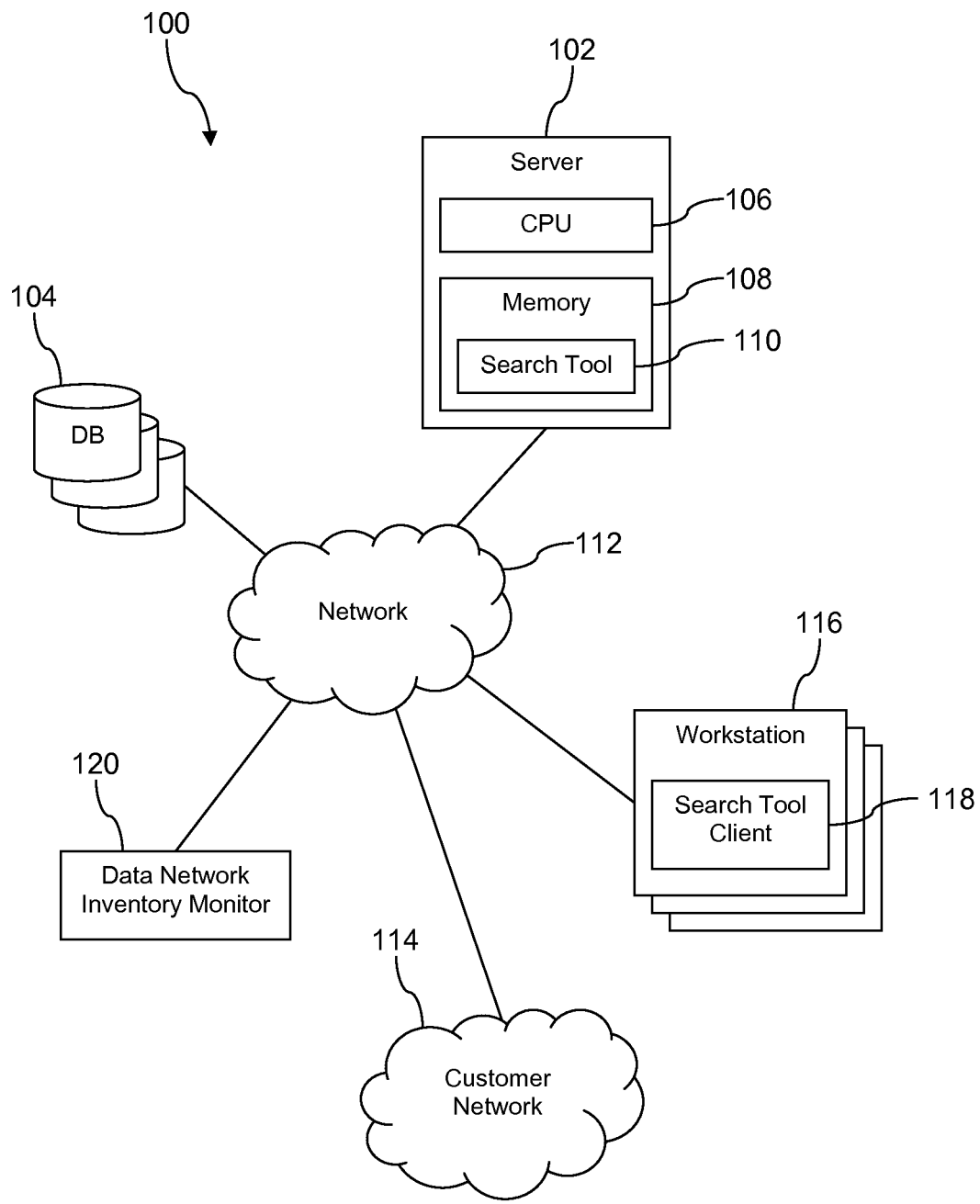
FIG. 1 is a block diagram of a communication network in accordance with an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Managing a data communication network infrastructure operated by a data communications service provider is a daunting task. To troubleshoot a communication outage or other service problems, formerly users, for example software engineers or information technology workers, logged into interfaces of each of a variety of data stores sequentially and dug around for information relevant to the communication outage or service problem. Because their access was serial, the users were often deceived by red herrings in the information accessed from a first data store that could have been avoided if they had accessed the second data store at the same time. This false trail delayed finding the actual solution to the outage problem. Additionally, having to log into a variety of different interfaces and having to use different command sets for different data stores likewise may have made troubleshooting outages more time consuming and difficult.

The present disclosure teaches a system for troubleshooting a data communication network infrastructure. The troubleshooting system provides an interface for users, for example software engineers or information technology workers, to define search criteria, perform concurrent searches of a plurality of data stores based on the search criteria, and to present the results of the searches in chronological order to the user. The search criteria may identify a trouble ticket associated with a service outage, may identify a customer of the data communication service provider, or may identify other things relevant to a problem or inquiry. The search criteria further may identify other parameters to constrain the search, for example a start time and an end time, for example specific network infrastructure components such as a network router or components of a network router such as an interface, a circuit card, or a port.

The system may search one or more of a systems log data store, a router command data store, a maintenance data store, an alarms data store, a trouble ticket data store, a customer change request data store, and/or a performance exceptions data store. The systems log data store may comprise log entries from a plurality of network routers and/or log entries from a customer router, for example a customer router associated with a service agreement for the data communication service provider to manage one or more of the customer's routers. The router command data store may comprise log entries for each administrator or root user command executed on network and customer routers. The maintenance data store may comprise entries describing or identifying maintenance performed on the network routers, the customer routers, or other data communication network infrastructure. The alarms data store may comprise entries describing network alarms and/or customer alarms, for example entries indicating undesirable conditions or states of components of the network. The trouble ticket data store may comprise trouble tickets identifying and describing shortcomings or failings in the communication network. The customer change request data store may comprise entries describing changes requested by customers.

The performance exceptions data store may comprise entries describing and/or defining various performance exceptions for the performance parameters associated with the data network infrastructure. In an embodiment, a performance reporting system monitors network performance parameters such as interface utilization, error rate, discard rate, CPU utilization, and memory utilization for managed customer devices. When a performance parameter exceeds a predefined and/or configured performance threshold, a performance exception is generated. As an example, a performance threshold may be predefined as when an interface is over 80% utilized for 30 out of the last 60 minutes. In an embodiment, the performance exceptions may be used as a source of information to promote troubleshooting.

The system analyzes the search criteria to prepare for searching the plurality of data stores. The analysis may, for example, comprise identifying a circuit identity (ID) associated with a specified trouble ticket or identifying one or more circuit IDs associated with a specified customer. The analysis may map from the one or more circuit IDs to router identity, interface identity, port identity, controller identity, and other identities associated with the circuit ID or IDs. The searches of the plurality of data stores is then conducted based on one or more of the router, interface, port, controller identities. The searches may further be conducted, at least in part, based on a port Internet protocol (IP) address, a class of service, virtual routing and forwarding (VRF) parameters, or other router port parameters. It is understood that different data stores may be searched using different data store keys. Additionally, some data stores may be searched in a single search specifying two or more keys. Alternatively, some data stores may be searched multiple times, each search performed using a different single key.

The system then orders the results returned by the concurrent searches in chronological order. In an embodiment, the system further color codes the results based on the source of each result, for example each row of the results. The system presents the chronologically ordered results to the requesting user, for example in a display of a user workstation. In an embodiment, the system may execute on a server computer, and the user may access the system via a workstation, laptop, tablet computer, or other device. The user device may comprise a troubleshooting client that communicates with the system. The user may then scan through the results and readily identify a sequence of logs or information from disparate sources related to the search criteria. The user may click on a details box associated with some of the results to drill down for further details. Based on the comprehensive picture that the user develops, they may be able to rapidly troubleshoot and fix many data communications network problems.

Turning now to FIG. 1, a system 100 is described. In an embodiment, the system 100 comprises a troubleshooting system 102 and a plurality of data stores 104. The troubleshooting system 102 comprises a processor 106 and a non-transitory memory 108 that stores a search tool 110. The troubleshooting system 102 may be implemented on one or more server computers. Computers are described in more detail hereinafter. The system 100 further comprises a network 112, an optional customer network 114, a workstation 116 having a search tool client 118, and a data network inventory monitor 120. The network 112 may comprise any combination of public and private networks. The optional customer network 114 may be considered to be part of the network 112 but is shown separately here to promote ease of discussion of a managed customer router service option. The workstation 116 may be a desktop computer, a laptop computer, a notebook computer, a tablet computer, a mobile handset, a personal digital assistant (PDA), or another device. A plurality of workstations 116 may access and request searches from the search tool 110 at substantially the same time, for example by the search tool 110 processing the searches requested by different users in a round robin and/or time shared manner.

The data network inventory monitor 120 is a tool that provides real-time status information on the components of the network 112 and/or the customer network 114, for example status information about routers, the interfaces of the routers, the ports of the interfaces, and like information. The data network inventory monitor 120 may identify data communication circuits with a circuit identity (circuit ID) and indicate the status of those circuits. In an embodiment, the search tool 110 may access the data network inventory monitor 120 to determine what router, interface, and/or port is associated with a circuit identity (circuit ID).

Figure 2:
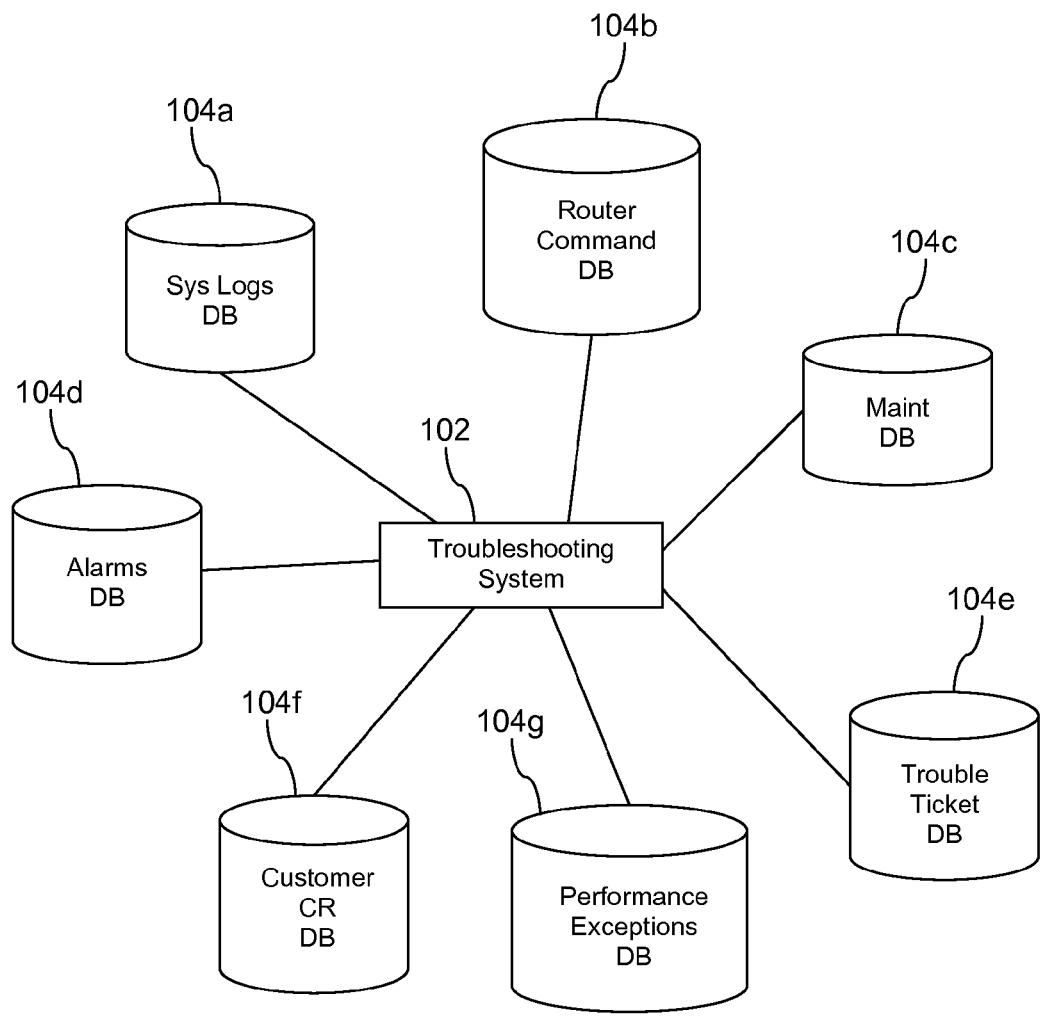
FIG. 2 is a block diagram of a troubleshooting system in communication with a plurality of data stores in accordance with an embodiment of the disclosure.

Turning now to FIG. 2, further details of the plurality of data stores 104 are described. In an embodiment, the plurality of data stores 104 comprise a system logs data store 104a, a router command data store 104b, a maintenance data store 104c, an alarms data store 104d, a trouble ticket data store 104e, a customer change request data store 104f, and a performance exceptions data store 104g. The systems log data store 104a may comprise log entries from a plurality of network routers and/or log entries from a customer router, for example a customer router associated with a service agreement for the data communication service provider to manage one or more of the customer's routers. The router command data store 104b may comprise log entries for each administrator or root user command executed on network and customer routers. The maintenance data store 104c may comprise entries describing or identifying maintenance performed on the network routers, the customer routers, or other data communication network infrastructure. The alarms data store 104d may comprise entries describing network alarms and/or customer alarms, for example entries indicating undesirable conditions or states of components of the network. The trouble ticket data store 104e may comprise trouble tickets identifying and describing shortcomings or failings in the communication network. The customer change request data store 104f may comprise entries describing changes requested by customers. The performance exceptions data store 104g may comprise entries describing and/or defining various performance exceptions for the data network infrastructure, for example events where performance parameters associated with the data network exceeded predefined performance thresholds.

Figure 3:
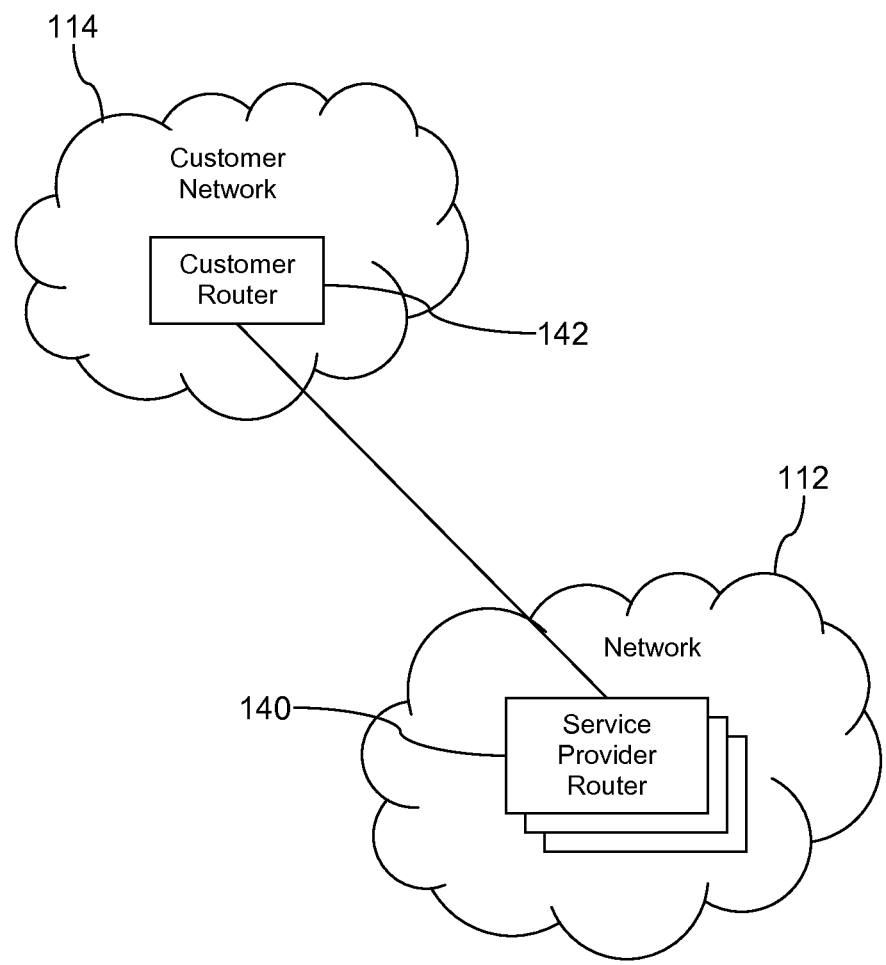
FIG. 3 is a block diagram of a data communication link between a customer router and a service provider router according to an embodiment of the disclosure.

Turning now to FIG. 3, further details of the network 112 and the customer network 114 are described. A data communication service provider may provide data communication subscription services to customers such as enterprises and/or businesses. As is known to those skilled in the art, much of the data communication infrastructure may comprise routers that provide network layer functionality, for example Internet Protocol (IP) functionality. In an embodiment, a service provider router 140 in the network 112 may be coupled to a customer router 142 in the customer network 114. The service provider router 140 may be said to couple the customer router 142 to the network 112 and/or to couple the customer network 114 to the network 112.

In some cases, customers are responsible for managing, troubleshooting, and fixing their own customer routers 142. This may be the case, for example, when the customer has a sophisticated information technology department that is skilled and knowledgeable about data communications technology. In other cases, however, the customers may contract with the data communication service provider to manage, troubleshoot, and fix the customer router 142. It is contemplated that the troubleshooting system 102 may be configured to promote searching for information about the customer router 142 to support managing, troubleshooting, and fixing the customer router 142 pursuant to such a contractual agreement. In some contexts, a customer that engages the data communication service provider to provide this service may be referred to as a managed customer.

Referring now to FIG. 1, FIG. 2, and FIG. 3, the troubleshooting system 102 is further described. The search tool 110 promotes a user inputting search commands or other troubleshooting commands from the workstation 116 using the search tool client 118. The search command may include search parameters such as a circuit ID, a customer identity, a trouble ticket identity, a start and end time, and/or other parameters. The user may input a trouble ticket identity. The search tool 110 may access the trouble ticket data store 104e and look up details of the subject trouble ticket.

The trouble ticket may identify, for example, a circuit ID associated with the problem. A circuit ID is an abstraction of a data communication service or resource provided to a customer. This abstract resource may be provided by one or more data communication components, such as a port of a specific interface on a specific router. The search tool 110 may access the data network inventory monitor 120 to look up data communication components based on the circuit ID. The data network inventory monitor 120 may look up all the routers, interfaces, circuit cards, ports, and virtual routing information that may be associated with the subject circuit ID, and return this information to the search tool 110. The data network inventor monitor 120 further may look up port Internet protocol (IP) addresses, a class of services, virtual routing and forwarding (VRF) parameters, or other router port parameters associated with the subject circuit ID and return this information to the search tool 110.

The search tool 110 may then use the information about involved routers, interfaces, circuit cards, ports, port parameters, and virtual routing information to initiate concurrent searches for related information in the data stores 104, for example in two or more of the system logs data store 104a, the router command data store 104b, the maintenance data store 104c, the alarms data store 104d, the trouble ticket data store 104e, the customer change request data store 104f, and/or the performance exception data store 104g. The search tool 110 selects which of the information about involved routers, interfaces, circuit cards, ports, port parameters, virtual routing information, and circuit ID to use as keys for searching the data stores 104, as each data store 104 may have different keys from the other data stores 104. It is understood that a given data store 104 may be searched with a plurality of keys. In an embodiment, a single search of a single data store 104 may be conducted by specifying multiple keys. Alternatively, in an embodiment, a single data store 104 may be searched multiple times, each search employing a different key. The search tool 110 may restrict the searches to a predefined time period, for example to data store entries that are time stamped between a start time and an end time that may have been provided in the search request by the search tool client 118. An unusually high number of logs entered for a particular router, device, card, port, or other network component during a period of time may also be used to identify and/or troubleshoot problems.

The results of the searches are entries in the several data stores 104 that were searched that match the search keys and/or search criteria. For example, if the router command data store 104b is searched to find all router commands performed on router ABC from 4 AM to 6 AM on a specific day, those entries in the router command data store 104b that satisfy those constraints are returned to the search tool 110 as results. The results from the concurrent searches are ordered in chronological order by the search tool 110. These chronologically ordered results are returned to the search tool client 118, and the search tool client 118 presents these, for example on a display, at the workstation 116. In an embodiment, the results may be presented using color coding or other indication to distinguish the source of the results, for example to distinguish results accessed in the system logs data store 104a from other results accessed in the router command data store 104b.

The user of the workstation 116 may scrutinize the ordered results and see at a glance the sweep of activities, events, and actions that have taken place during a selected time period and relative to a particular data communication resource, customer, or trouble ticket. The user may select a query button or other control associated with a result to drill down for further details associated with the search result. Because the results from different sources are interleaved in chronological order, the cause and effect relationships among events may more readily be deduced by the user. The task of the user is made easier because he or she only needs to log into one system, the search tool system, and only needs to learn to use the interface of one system, the search tool system.

Figure 4:
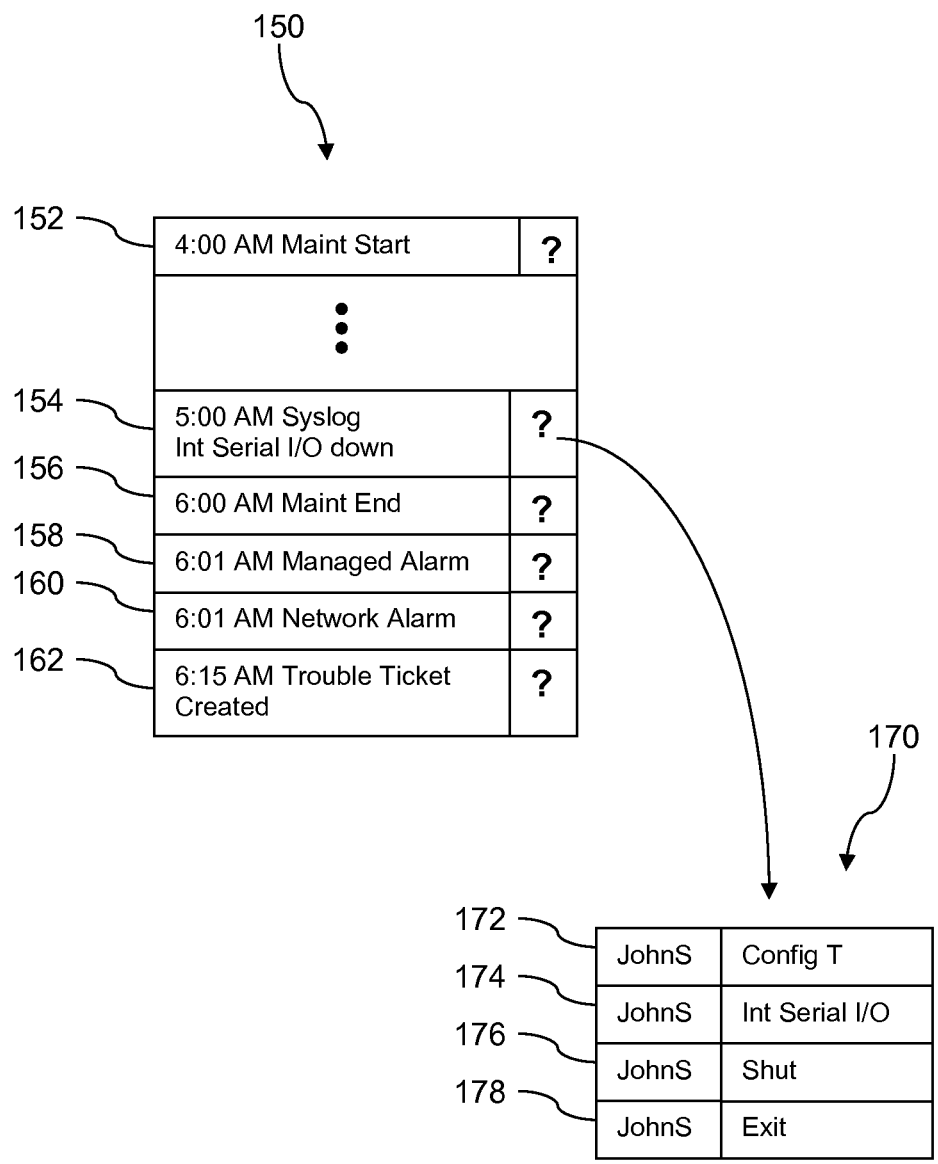
FIG. 4 is an illustration of an exemplary search result according to an embodiment of the disclosure.

Turning now to FIG. 4, an example set of results is described. In this example scenario, a maintenance event is performed on the network from 4 AM to 6 AM. During that maintenance event or activity all the ports in the devices that are affected by the maintenance are placed in a maintenance mode. In this mode, if a port goes down, it doesn't generate the usual alarms or trouble tickets because it is understood there is a maintenance event in progress that may affect various data communication components. At 6:15, however, a trouble ticket is created automatically identifying a circuit ID. The starting point for a network operation center (NOC) and/or a data communication technician may be to take care of the trouble ticket.

The technician may log into the search tool client 118 on a workstation 116 in the NOC. The technician may enter the trouble ticket identify and optionally a time period, for example the most recent day, the most recent operations shift, or some other period of time. In this example scenario, the workstation 116 presents search results 150. The user may scan the search results 150 in reverse order: trouble ticket created at 6:15 AM, as indicated by a first results 162. A managed alarm and a network alarm were posted at 6:01 AM, as indicated by a second result 158 and a third result 160. The user observes to himself or herself that alarms that are not cleared result in automatic creation of trouble tickets after a predefined period of time, for example after 15 minutes as in this scenario.

The maintenance event was completed successfully at 6 AM, as indicated by a fourth result 156. At 5 AM, however, a system log indicates that a serial I/O interface went down, as indicated by a fifth result 154. The user scans earlier to a sixth result 152, skipping over miscellaneous uninteresting intervening results (suggested by dots in FIG. 4), that shows the maintenance event beginning at 4 AM. The user may reasonably suppose that the cause of the problem reported in the trouble ticket is likely indicated in the results 152, 154, 156, 158, 160, 162. More specifically, the fifth result 154 about the serial I/O interface going down is intriguing.

The user may click on the query button at the right of the fifth result 154 to show a series of router commands 170 associated with the fifth result 154. The router commands 170 may have been searched and retrieved from the router command data store 104b based on the circuit ID identified in the trouble ticket. A first router command 172 may be a "config T" command performed by John Smith. A second router command 174 may be an "int serial I/O" command performed by John Smith. A third router command 176 may be a "shut"

command, for example to shut down the subject interface performed by John Smith. A fourth router command 178 may be "exit," to exit the router command tool performed by John Smith. From this sequence of router commands and in the context of the results 150, the user can surmise the trouble is that John Smith shut down the subject interface in association with performing the maintenance activity and then failed to turn the interface back on! The solution is easy: turn the interface back on. The time spent in troubleshooting the problem would likely have been very short.

Figure 5:
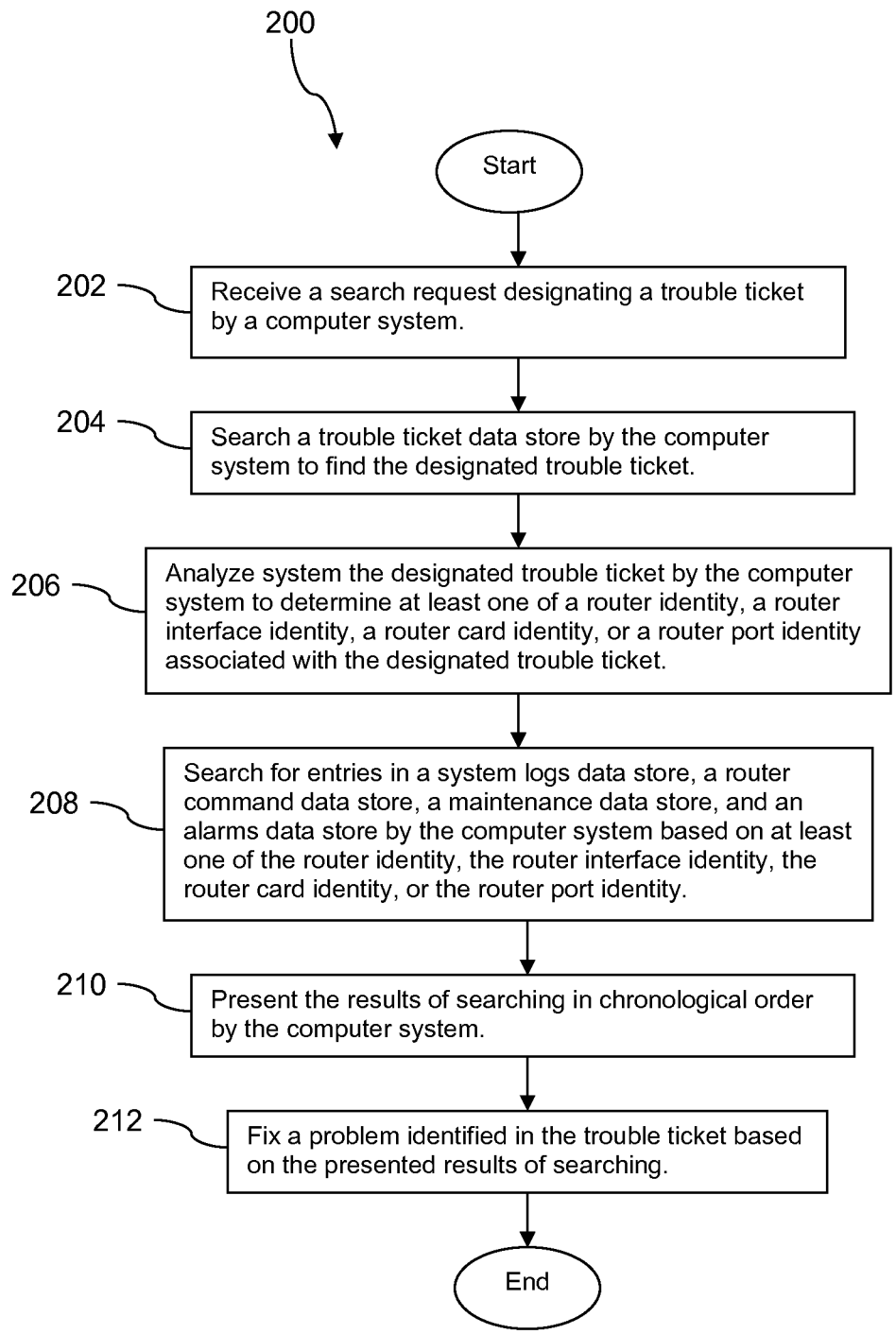
FIG. 5 is a flow chart of a method according to an embodiment of the disclosure.

Turning now to FIG. 5, a method 200 is described. At block 202, a search request is received by a computer system designating a trouble ticket. At block 204, a trouble ticket data store is searched by the computer system to find the designated trouble ticket. At block 206, the computer system analyzes the designated trouble ticket to determine at least one of a router identity, a router interface identity, a router card identity, or a router port identity associated with the designated trouble ticket. At block 208, the computer system searches for entries in a system logs data store, a router command data store, a maintenance data store, and an alarms data store based on at least one of the router identity, the router interface identity, the router card identity, or the router port identity. At block 210, the computer system presents the results of searching in chronological order. At block 212, a problem identified in the trouble ticket is fixed based on the presented results of searching. For example, the source of the problem is suggested by the presentation of search results in chronological order, and a service technician executes an administrative command to a data communication component to fix the problem.

Figure 6:
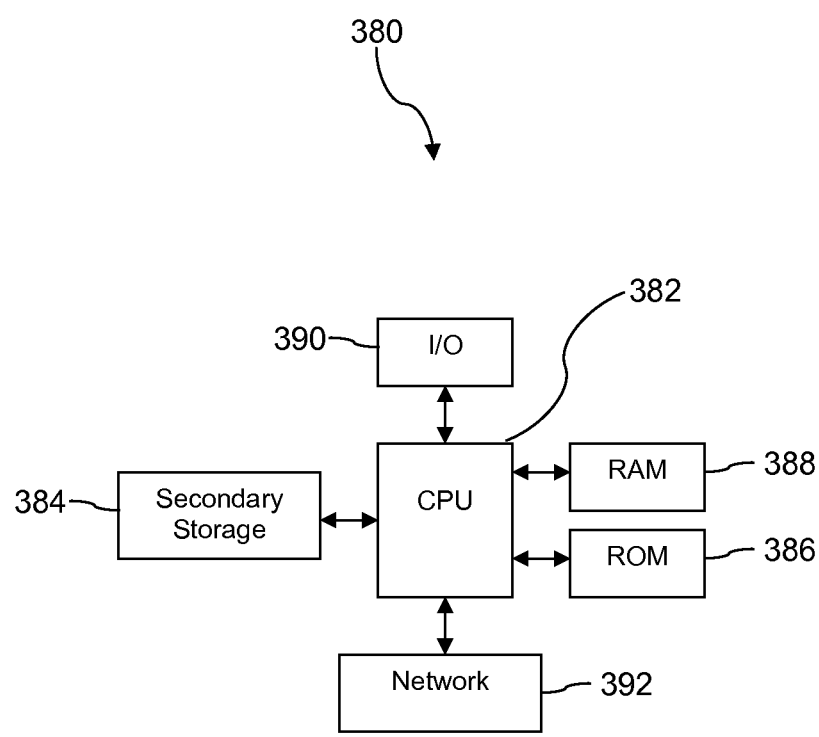
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A packet network troubleshooting system, comprising:
a system logs data store comprising system logs, wherein the system logs comprise log messages generated by a plurality of network routers;
a router command data store comprising router commands, wherein the router commands comprise commands executed on the plurality of network routers;
a maintenance data store comprising entries describing maintenance items associated with one or more of the plurality of network routers;
an alarms data store comprising alarms associated with one or more of the plurality of network routers;
a trouble ticket data store comprising trouble tickets opened against one or more of the network routers;
a processor coupled to the system logs data store, the router command data store, the maintenance data store, the alarms data store, and the trouble ticket data store;
a non-transitory memory coupled to the processor; and
a search tool stored in the non-transitory memory that, when executed by the processor
receives a search request designating a trouble ticket stored in the trouble ticket data store,
in response to receiving the search request, identifies at least one of a router, a router interface, a router card, a router controller, a router port associated with the trouble ticket,
determines a first search key for the system logs data store based on the at least one of a router, a router interface, a router card, a router controller, a router port associated with the trouble ticket, determines a second search key for the router command data store based on the at least one of a router, a router interface, a router card, a router controller, a router port associated with the trouble ticket, determines a third search key for the maintenance data store based on the at least one of a router, a router interface, a router card, a router controller, a router port associated with the trouble ticket, determines a fourth search key for the alarms data store based on the at least one of a router, a router interface, a router card, a router controller, a router port associated with the trouble ticket, searches the system logs data store based on the first search key, searches the router command data store based on the second search key, searches the maintenance data store based on the third search key, searches the alarms data store based on the fourth search key, and presents results of the search in chronological order.

2. The system of claim 1, wherein the search tool is configured to receive a time criteria and wherein the search tool further searches the system logs data store, the router command data store, the maintenance data store, and the alarms data store based on the time criteria.

3. The system of claim 1, wherein the search tool is configured to receive a customer identity and wherein the search tool further searches the system logs data store, the router command data store, the maintenance data store, and the alarms data store based on the customer identity.

4. The system of claim 1, wherein the search tool is configured to receive a router port identity and wherein the search tool further searches the system logs data store, the router command data store, the maintenance data store, and the alarms data store based on the router port identity.

5. The system of claim 1, wherein the search tool presents the results of the search with color coding to indicate the data store associated with each result.

6. The system of claim 1, wherein a result of the search comprises a selectable control to obtain additional information on the result.

7. The system of claim 1, wherein the alarms data store comprises network fault alarms and customer alarms, wherein customer alarms are associated with routers in a computer network of a customer and outside of a communications service provider packet network.

8. A packet network troubleshooting system, comprising:
a system logs data store comprising system logs, wherein the system logs comprise log messages generated by a plurality of network routers;
a router command data store comprising router commands, wherein the router commands comprise commands executed on the plurality of network routers;
a maintenance data store comprising entries describing maintenance items associated with one or more of the plurality of network routers;
an alarms data store comprising alarms associated with one or more of the plurality of network routers;
a trouble ticket data store comprising trouble tickets opened against one or more of the network routers;
a processor coupled to the system logs data store, the router command data store, the maintenance data store, the alarms data store, and the trouble ticket data store;
a non-transitory memory coupled to the processor; and a search tool stored in the non-transitory memory that, when executed by the processor
receives a search request designating a customer of a service provider, wherein the service provider that operates at least some of the plurality of network routers and provides network communication service to the customer,
in response to receiving the search request, identifies at least one of a router, a router interface, a router card, a router controller, a router port associated with the customer,
determines a first search key for the system logs data store based on the at least one of a router, a router interface, a router card, a router controller, a router port associated with the customer,
determines a second search key for the router command data store based on the at least one of a router, a router interface, a router card, a router controller, a router port associated with the customer,
determines a third search key for the maintenance data store based on the at least one of a router, a router interface, a router card, a router controller, a router port associated with the customer,
determines a fourth search key for the alarms data store based on the at least one of a router, a router interface, a router card, a router controller, a router port associated with the customer,
searches the system logs data store based on the first search key,
searches the router command data store based on the second search key,
searches the maintenance data store based on the third search key,
searches the alarms data store based on the fourth search key, and
presents results of the search in chronological order.

9. The system of claim 8, further comprising a customer change requests data store comprising customer requests for changed packet network services, wherein the search tool further
determines a fifth search key for the customer change requests data store based on the at least one of a router, a router interface, a router card, a router controller, a router port associated with the customer, and
searches the customer change requests data store based on the fifth search key.

10. The system of claim 8, wherein the systems log data store comprises system log messages generated by customer routers, wherein the customer routers are located in customer computer networks and outside of a communications service provider packet network.

11. The system of claim 8, wherein the search tool further obtains customer data communication service status information based on at least one of a router, a router interface, a router card, a router controller, a router port associated with the customer and presents the service status information.

12. The system of claim 8, wherein the searches of the system logs data store, the router command data store, the maintenance data store, and the alarms data store are performed concurrently.

13. The system of claim 8, wherein the search tool is configured to receive a time criteria and wherein the search tool further searches the system logs data store, the router command data store, the maintenance data store, and the alarms data store based on the time criteria.

14. The system of claim 8, wherein the search tool is configured to receive a trouble ticket identity and wherein the search tool further searches the system logs data store, the router command data store, the maintenance data store, and the alarms data store based on the trouble ticket.

15. The system of claim 8, wherein the search tool is configured to receive a router port identity and wherein the search tool further searches the system logs data store, the router command data store, the maintenance data store, and the alarms data store based on the router port identity.

16. The system of claim 8, wherein the search tool presents the results of the search with color coding to indicate the data store associated with each result.

17. A method of troubleshooting a packet network communication problem, comprising:
- receiving by a computer system a search request designating a trouble ticket;
- searching by the computer system a trouble ticket data store to find the designated trouble ticket;
- analyzing by the computer system the designated trouble ticket to determine at least one of a router identity, a router interface identity, a router card identity, or a router port identity associated with the designated trouble ticket;
- searching by the computer system for entries in a system logs data store, a router command data store, a maintenance data store, and an alarms data store based on at least one of the router identity, the router interface identity, the router card identity, or the router port identity;
- presenting by the computer system the results of searching in chronological order; and
- fixing a problem identified in the trouble ticket based on the presented results of searching.

18. The method of claim 17, wherein presenting the results of searching comprises presenting the results color coded to indicate the source of each result.

19. The method of claim 17, further comprising
- receiving by the computer system a search request designating a customer;
- identifying at least one of a router identity, a router interface identity, a router card identity, or a router port identity associated with the customer.

20. The method of claim 17, wherein the alarms data store comprises network fault alarms and customer alarms, wherein customer alarms are associated with routers in a computer network of a customer and outside of a communications service provider packet network.

\* \* \* \* \*